Patented May 26, 1925.

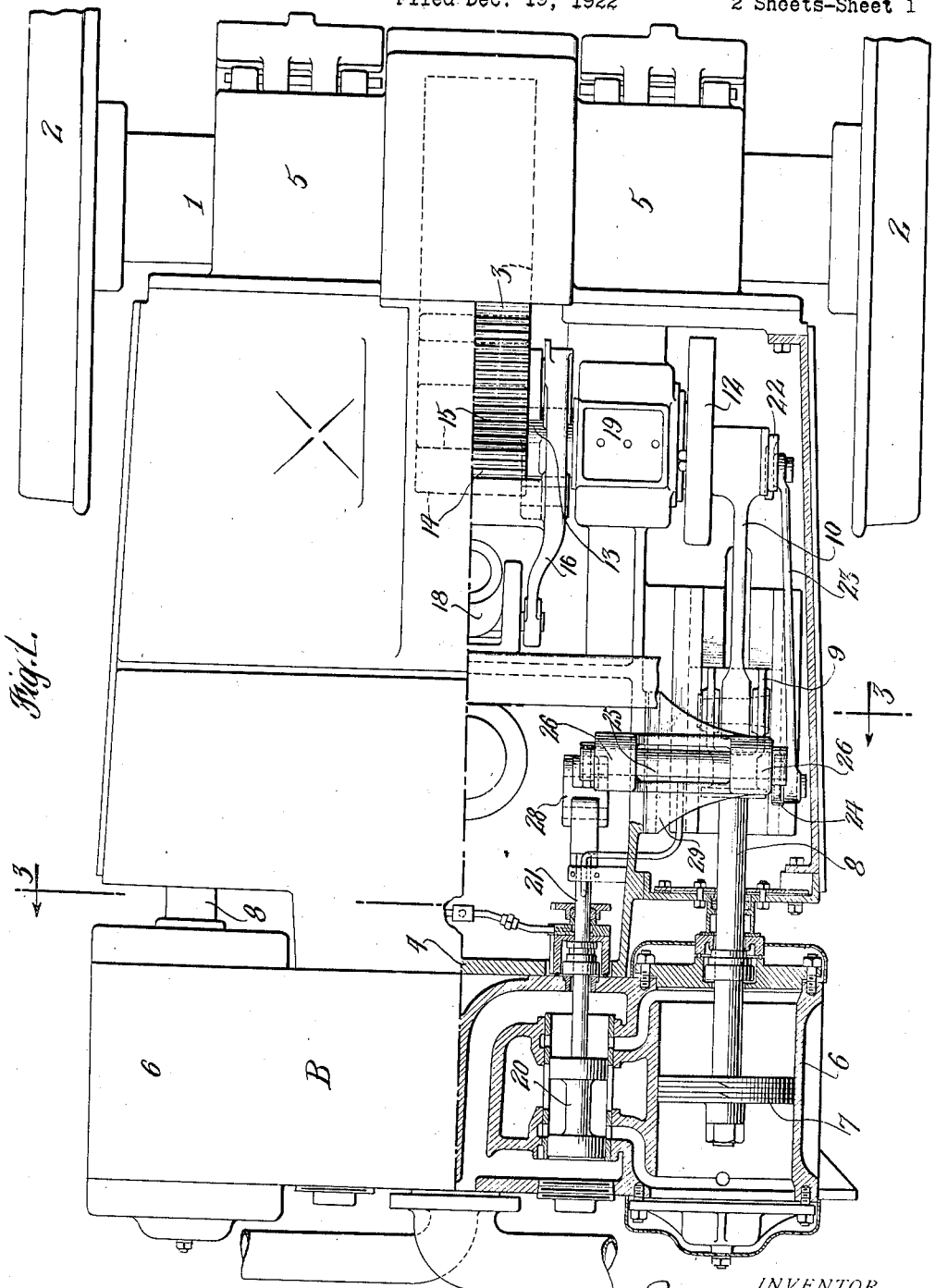

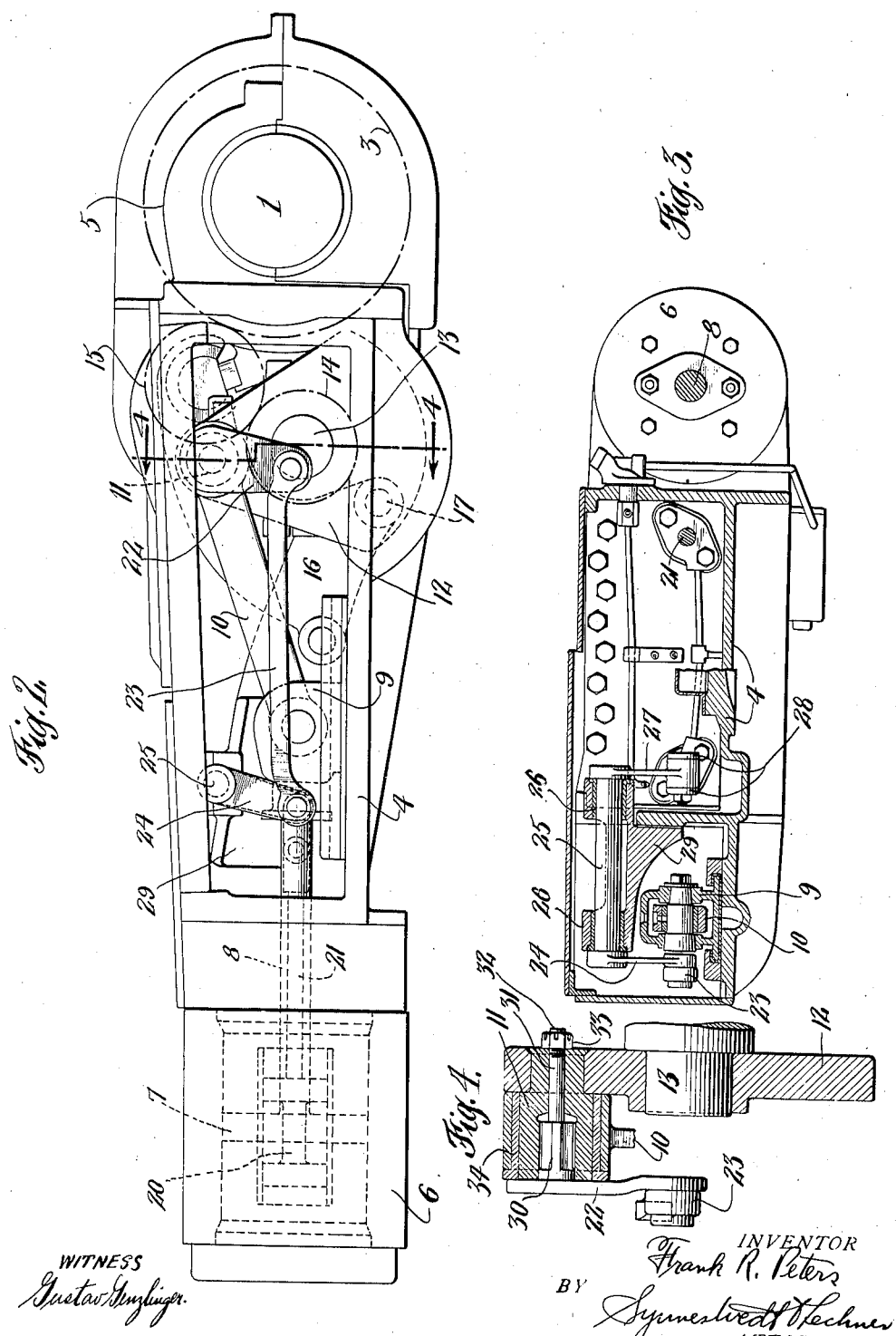

1,539,270

UNITED STATES PATENT OFFICE.

FRANK R. PETERS, OF NEW YORK, N. Y., ASSIGNOR TO FRANKLIN RAILWAY SUPPLY COMPANY, A CORPORATION OF DELAWARE.

LOCOMOTIVE BOOSTER-MOTOR CONSTRUCTION.

Application filed December 19, 1922. Serial No. 607,764.

*To all whom it may concern:*

Be it known that I, FRANK RICHARD PETERS, a subject of the King of Great Britain, residing in the city of New York, county of New York and State of New York, United States of America, have invented certain new and useful Improvements in Locomotive Booster-Motor Constructions, of which the following is a specification.

This invention relates to locomotive booster motors of the type which are designed to drive a normally idle axle at a point intermediate the wheels which it carries such for instance as an axle of a trailer truck, or an axle of a leading truck or one on a tender. In this type there is generally a very limited space available for the booster motor parts some of which must be exceedingly strong and of ample capacity in order to perform their functions properly and adequately under the heavy duty conditions frequently imposed upon the booster.

It is, therefore, a principal object of my invention to provide a novel booster motor construction which is unusually rugged, simple and accessible. I particularly aim to provide adequate bearing surface for the booster motor crank shaft and to this end I dispose the valve motion parts in such way as to make this possible within the space limitations above referred to. In attaining these objects and advantages as well as others incident to my invention I provide novel valve motion parts and connections all of which will be more fully described hereinafter in connection with the accompanying drawings which illustrate my invention in its preferred form and wherein—

Fig. 1 is partly a plan view and partly a horizontal plan section illustrating my invention as embodied in a booster motor for driving the axle and wheels of a trailer truck; Fig. 2 is a side elevation of a booster motor embodying my invention; Fig. 3 is a section on the line 3—3 of Fig. 1; and Fig. 4 is a section on the line 4—4 of Fig. 2.

If desired reference may be made to patent No. 1,339,395 issued on May 11, 1920, to H. L. Ingersoll as illustrating in considerable detail a booster motor equipment in many respects similar to the type which is herein exemplified.

By referring to the drawings it will be seen that I have illustrated an axle 1 of a locomotive trailer truck although my invention could just as well be embodied in a construction which was applied to the axle of a leading truck or to an axle of a tender. The wheels 2 revolve with the axle as is common in locomotive practice. At substantially the center of the axle there is provided a gear 3.

The booster motor B is mounted upon or associated with what is termed the booster bed plate 4 which is constructed to provide a pair of spaced bearings 5, one at each side of the axle gear 3. These bearings 5 form the support for one end of the booster motor structure the other end being supported in a number of different ways as particular circumstances or conditions require. This is not illustrated however as it forms no part of the present invention and would merely tend to complicate and enlarge the character of the drawings.

The booster motor comprises a pair of cylinders 6 within which reciprocate pistons 7. Power is transmitted through the piston rods 8, cross heads 9, connecting rods 10, crank pins 11 and combined crank arms and counterweights 12. A crank arm 12 is mounted at each end of the crank shaft 13 at substantially the center of which is keyed the driving pinion 14. From the driving pinion 14 the power is transmitted to the axle gear 3 through the medium of an idler gear 15 mounted for rocking movement upon the rocker 16 pivoted at the point 17. The idler gear rocker 16 is moved by means of a small motor 18 the details of which are not herein illustrated since they form no part of the present invention. Suffice it to say that this motor 18 can move the idler gear 15 toward the axle gear 3 when it is desired to mesh it therewith for the purpose of driving the axle 1 and away therefrom when it is desired to disconnect the booster from the axle. At all times however the idler gear 15 is in mesh with the driving pinion 14.

At each side of the driving pinion 14 I provide the crank shaft with a large capacity bearing 19 beyond which is arranged the crank arm 12 with its crank pin 11.

Each cylinder in the booster motor is provided with a valve 20 located preferably to the inside of the cylinder. This arrangement brings the two valves adjacent each other and makes possible a very convenient disposition of the supply and exhaust pipes and passages for the steam. Ordinarily the valve 20 would receive its motion through the medium of an eccentric mounted upon the crank shaft at a point substantially in the longitudinal plane of the valve rod 21. This however it will be seen by inspection of Fig. 1 would prevent the use of the large sized bearing 19 already referred to since, in order to provide room for the eccentric between the bearing and the gear or driving pinion it would be necessary to reduce the width of the bearing. Such a reduced bearing would not be adequate for the heavy duty to which the booster is put.

I therefore provide a valve gear which takes its motion from the eccentric arm 22 on the crank pin. A connecting rod 23 transmits this motion to the arm 24 of a rocker shaft 25 journalled in spaced bearings 26. Another arm 27 at the inner end of the rocker shaft 25 continues the motion by means of the link 28 which is connected to the valve rod 21. There are of course suitable pins on the arms 22, 24 and 27 through the medium of which the parts can be articulated. The bearings 26 are supported upon a bracket 29 associated with the bed plate 4.

The crank pin construction is one of particular novelty and is illustrated in detail in Fig. 4. The arm 22 instead of being made integral with the crank pin 11 is constructed as a separate member having a stub 30 projecting laterally therefrom which latter is extended into a bolt 31 having the threaded end 32. The stub portion 30 has a non-rotative fit in the crank pin 11 and the latter may be press fitted or otherwise non-rotatively secured in the crank 12, the whole member being held in position by means of the nut 33. The arrangement serves to position the connecting rod on the crank pin. A bearing 34 of course fits between the connecting rod 10 and the crank pin 11. This detailed construction is very advantageous in carrying out my invention for the reason that it permits easy assembly of the connecting rod 10. Furthermore, there is no necessity for splitting the portion of the connecting rod which surrounds the crank pin 11 as there would be were the arm 22 made integral with the crank pin 11.

From the foregoing it will be seen that the crank shaft 13 is substantially parallel with the driven axle 1 and closely adjacent thereto. This makes it necessary to dispose of the crank shaft with its gear, bearings, cranks, crank pins, and valve eccentrics in the space between the wheels 2. Furthermore, the idler gear 15 with its yoke-shaped rocker 16, must be arranged for also. My improved construction permits the use of bearings of ample size for the crank shaft while at the same time allowing sufficient space for the convenient assembly of the other parts in efficient and durable forms.

The entire structure is compact and accessible and of sufficient ruggedness to be able to stand up under the severest service. As shown the cylinders and cylinder valves with their valve chests lie in substantially the same horizontal plane.

I claim:

1. In combination, a normally idle railway vehicle axle with its wheels, a crank shaft parallel to said axle between the wheels, gearing between the axle and the crank shaft, a large capacity bearing for the crank shaft on each side of the gearing, crank pins outside the bearings, a booster cylinder and piston opposite each crank pin, a connecting rod between each piston and crank pin, cylinder valves between the cylinders, and valve motion parts crossing the connecting rods and connected to the crank shaft beyond the crank pins.

2. In combination, a normally idle railway vehicle axle with its wheels, a crank shaft parallel to said axle between the wheels, gearing between the axle and the crank shaft, a large capacity bearing for the crank shaft on each side of the gearing, crank pins outside the bearings, a booster cylinder and piston opposite each crank pin, a connecting rod between each piston and crank pin, a cylinder valve substantially in line with each bearing, and valve motion parts crossing the connecting rods and connected to the crank shaft beyond the crank pins.

3. In combination, a normally idle railway vehicle axle with its wheels, a crank shaft parallel to said axle between the wheels, gearing between the axle and the crank shaft, a large capacity bearing for the crank shaft on each side of the gearing, a pair of booster cylinders and pistons, connecting rods for the pistons, cylinder valves inside the planes of the connecting rods, and valve motion parts connected to the crank shaft outside the connecting rods.

4. In combination, a normally idle railway vehicle axle with its wheels, a crank shaft parallel to said axle between the wheels, gearing between the axle and the crank shaft, a large capacity bearing for the crank shaft on each side of the gearing, crank pins outside the bearings, a pair of booster cylinders and pistons, a connecting rod between each piston and its respective crank pin, cylinder valves located to the inside of the planes of the crank pins, rocker shafts extending from substantially the planes of the valves to substantially the planes of the crank pins, valve motion parts at the inner ends of the rocker shafts connected to the valves, and valve motion parts at the outer ends of the rocker shafts connected to the crank shaft beyond the crank pins.

5. In combination, a normally idle railway vehicle axle with its wheels, a crank shaft parallel to said axle between the wheels, means for connecting the shaft to said axle, a large capacity bearing for the shaft on each side of said connecting means, crank pins outside the bearings, a pair of booster motor cylinders with their valves and valve chests arranged in substantially the same horizontal plane and with the valves between the cylinders, connecting rods between the pistons and the crank pins, and valve motion parts crossing the connecting rods and connected to the crank shaft beyond the crank pins.

6. In combination, a normally idle railway vehicle axle with its wheels, a crank shaft parallel to said axle between the wheels, gearing between the axle and the crank shaft, a large capacity bearing for the crank shaft on each side of the gearing, a crank pin at the outside of each bearing, a booster cylinder and piston opposite each crank pin, a connecting rod having an eye adapted to fit over each crank pin, a valve for each cylinder, a detachable eccentric member on the outside of each crank pin adapted to retain the connecting rod on the pin, and valve motion parts between the eccentrics and the valves.

In testimony whereof I have hereunto signed my name.

FRANK R. PETERS.